US012255431B2

(12) United States Patent
Pan et al.

(10) Patent No.: US 12,255,431 B2
(45) Date of Patent: Mar. 18, 2025

(54) TAIL POKING COVER CONNECTOR WITH CAGE-TYPE CONDUCTING MECHANISM

(71) Applicant: Guangdong Ojun Technology Co., Ltd, Foshan (CN)

(72) Inventors: Changxiong Pan, Foshan (CN); Yaoguang Xiao, Foshan (CN)

(73) Assignee: Guangdong Ojun Technology Co., Ltd, Foshan (CN)

( * ) Notice: Subject to any disclaimer, the term of this patent is extended or adjusted under 35 U.S.C. 154(b) by 340 days.

(21) Appl. No.: 18/146,271

(22) Filed: Dec. 23, 2022

(65) Prior Publication Data

US 2023/0420872 A1 Dec. 28, 2023

(51) Int. Cl.
*H01R 4/48* (2006.01)
*H01R 11/09* (2006.01)

(52) U.S. Cl.
CPC ............ *H01R 4/4816* (2023.08); *H01R 11/09* (2013.01)

(58) Field of Classification Search
CPC .......... H01R 4/28; H01R 4/48; H01R 4/4809; H01R 4/4846; H01R 4/4848; H01R 4/485; H01R 4/483
See application file for complete search history.

(56) References Cited

U.S. PATENT DOCUMENTS

| | | | | |
|---|---|---|---|---|
| 10,673,153 B1 * | 6/2020 | Pan | H01R 4/483 | |
| 11,764,498 B2 * | 9/2023 | Chen | H01R 4/4846 | 439/709 |

FOREIGN PATENT DOCUMENTS

| | | |
|---|---|---|
| CN | 103036113 A | 4/2013 |
| CN | 216648652 U | 5/2022 |

* cited by examiner

*Primary Examiner* — Vanessa Girardi

(57) ABSTRACT

A tail poking cover connector with a cage-type conducting mechanism comprises a front housing and a rear housing; a front open chamber is arranged in the rear housing; the front housing is used for closing the front open chamber; the cage-type conducting mechanism is arranged in the front open chamber, and the cage-type conducting mechanism comprises a conducting frame and a conducting component; the conducting frame comprises an inclined vertical part, an upper transverse part and a lower transverse part; and ports are formed in the inclined vertical part, the upper transverse part is provided with conducting heads extending backwards to the position above the lower transverse part, and clamping grooves are formed at the top of the lower transverse part.

7 Claims, 5 Drawing Sheets

TAIL POKING COVER CONNECTOR WITH CAGE-TYPE CONDUCTING MECHANISM

CROSS REFERENCE TO RELATED APPLICATIONS

This application claims foreign priority of Chinese Patent Application No. 202221627626.1, filed on Jun. 27, 2022 in the China National Intellectual Property Administration, the disclosures of all of which are hereby incorporated by reference.

TECHNICAL FIELD

The present invention relates to a structural improvement of an electrical connector.

BACKGROUND OF THE PRESENT INVENTION

Conducting devices of traditional electrical connectors are configured as split type structures, i.e., all conducting components are fixedly installed in a plastic housing respectively, and cannot be fixedly connected with each other into a whole. Once the plastic housing is damaged, all the conducting components become loose and misplaced easily, leading to failure of normal power-on.

SUMMARY OF PRESENT INVENTION

The present invention aims to improve the above defects existing in traditional electrical connectors.

For this purpose, the present invention adopts the following technical solution:

A tail poking cover connector with a cage-type conducting mechanism comprises a front housing and a rear housing, a front open chamber is arranged in the rear housing, and the front housing is fixedly connected with the rear housing to close the front open chamber; and the cage-type conducting mechanism is arranged in the front open chamber, and poking covers are arranged on the rear housing. The cage-type conducting mechanism comprises a conducting frame and a conducting component; the conducting frame is in a Z shape and comprises an inclined vertical part as well as an upper transverse part and a lower transverse part that are respectively arranged at the top end and the bottom end of the vertical part; and a plurality of ports are formed transversely side by side in the inclined vertical part, the upper transverse part is provided with a plurality of conducting heads corresponding to the ports up and down one to one and extending backwards to the position above the lower transverse part, and a plurality of clamping grooves corresponding to the ports up and down one to one are formed at the top of the lower transverse part. The conducting component comprises a plurality of V-shaped conducting elastic sheets that are arranged on a same conducting board and have the same number with the ports; each of the V-shaped conducting elastic sheets comprises an upper elastic sheet and a lower elastic sheet; and all the conducting elastic sheets are fixedly connected with the conducting board by the tails ends of the respective lower elastic sheets transversely at intervals, so that the respective upper elastic sheets are arranged above the conducting board in an upwarping manner. The conducting frame is fixedly installed in the front open chamber in a manner that the upper transverse part is arranged at a front part, and the lower transverse part is arranged at a rear part; the plurality of V-shaped conducting elastic sheets on the conducting component are respectively spliced into the plurality of ports in a one-to-one correspondence manner with the sharp heads facing forwards; and the rear end of the conducting board is spliced and fixed into all the clamping grooves, so that the conducting component and the conducting frame are fixedly connected with each other into a whole, the lower elastic sheets of all the V-shaped conducting elastic sheets are electrically connected with the conducting frame, and the tail ends of all the upper elastic sheets are elastically supported on the bottom surfaces of the respective corresponding conducting heads.

As a preferred solution, a plurality of front wire plugging holes corresponding to the ports one to one are formed in the front end surface of the front housing, and each of the front wire plugging holes penetrates through to the top surface of the upper elastic sheet of the respective corresponding V-shaped conducting elastic sheet.

As a preferred solution, a rear wiring hole directly facing any clamping groove is arranged in the rear end surface of the rear housing.

As a preferred solution, the number of the poking covers is the same as that of the V-shaped conducting elastic sheets; and each poking cover is rotatably arranged in the rear housing and is used for driving the upper elastic sheet of the corresponding V-shaped conducting elastic sheet to move downwards, so as to separate from the corresponding conducting head, and the rear end of each poking cover is exposed out of the upper part of the rear housing, to facilitate for the driving for the respective front end of the poking cover to rotate.

As a preferred solution, an upwarping part in contact with the conducting head is arranged at the rear end of the upper elastic sheet of each V-shaped conducting elastic sheet, and the left side and the right side of the upwarping part are symmetrically provided with downward arc-shaped bent driving lugs.

Each of the poking covers comprises a handle exposed out of the rear upper part of the rear housing and two quasi-circular rotating arms arranged at the front end of the handle symmetrically left and right; and the two quasi-circular rotating arms are arranged in through holes formed in the top surface of the rear housing and are rotatably connected with the rear housing by axon parts arranged on the respective inner surfaces and are slidably connected with the two driving lugs on the corresponding V-shaped conducting elastic sheet by "7"-shaped grooves formed in the front lower parts of the respective axon parts respectively.

As a preferred solution, the clamping grooves are formed in the top surface of the tail end of the lower transverse part.

As a preferred solution, each of the clamping grooves is formed by transversely and upwards bending a clamping strip on the lower transverse part at the bottom end.

The present invention is provided with the cage-type conducting mechanism formed by the conducting frame and the conducting component that are fixedly connected with each other into a whole. Even though the housings are partially damaged due to long-time heating, the cage-type conducting mechanism can still keep a connection state and normal power-on, thereby facilitating the improvement of the reliability of the electrical connector and prolonging the service life of the electrical connector.

DETAILED DESCRIPTION OF PREFERRED EMBODIMENTS

The present invention is described below in combination with the drawings and specific embodiments.

Figure 1:
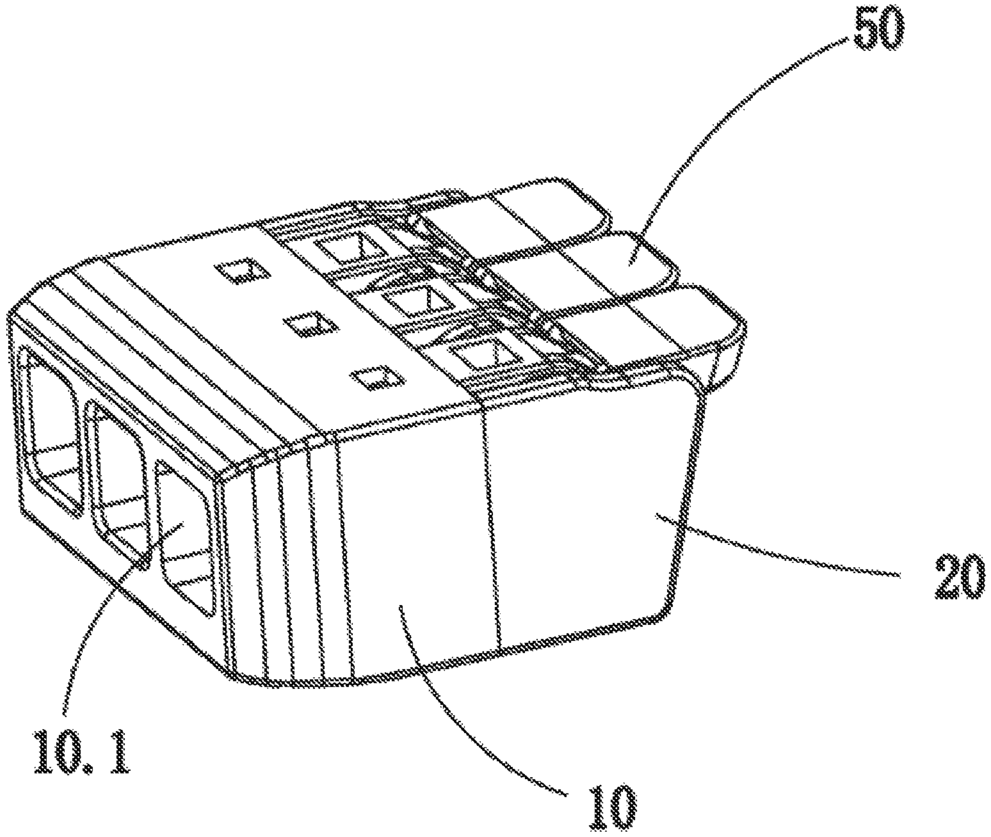
FIG. 1 is an overall structural schematic diagram of an embodiment of the present invention.
Figure 2:
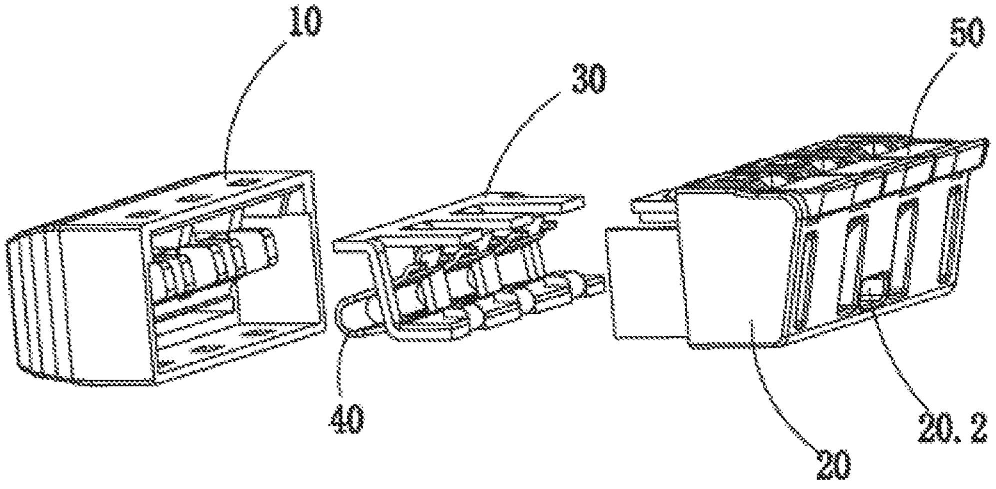
FIG. 2 is an overall structural explosive view of the embodiment of the present invention.
Figure 3:
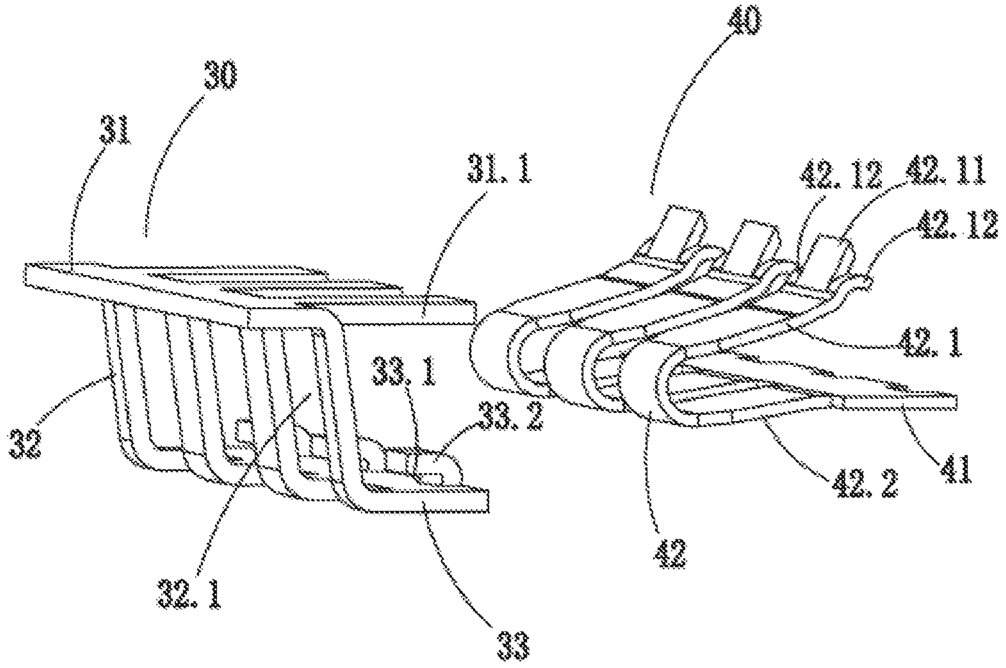
FIG. 3 is a structural schematic diagram of a cage-type conducting mechanism of the embodiment of the present invention.
Figure 4:
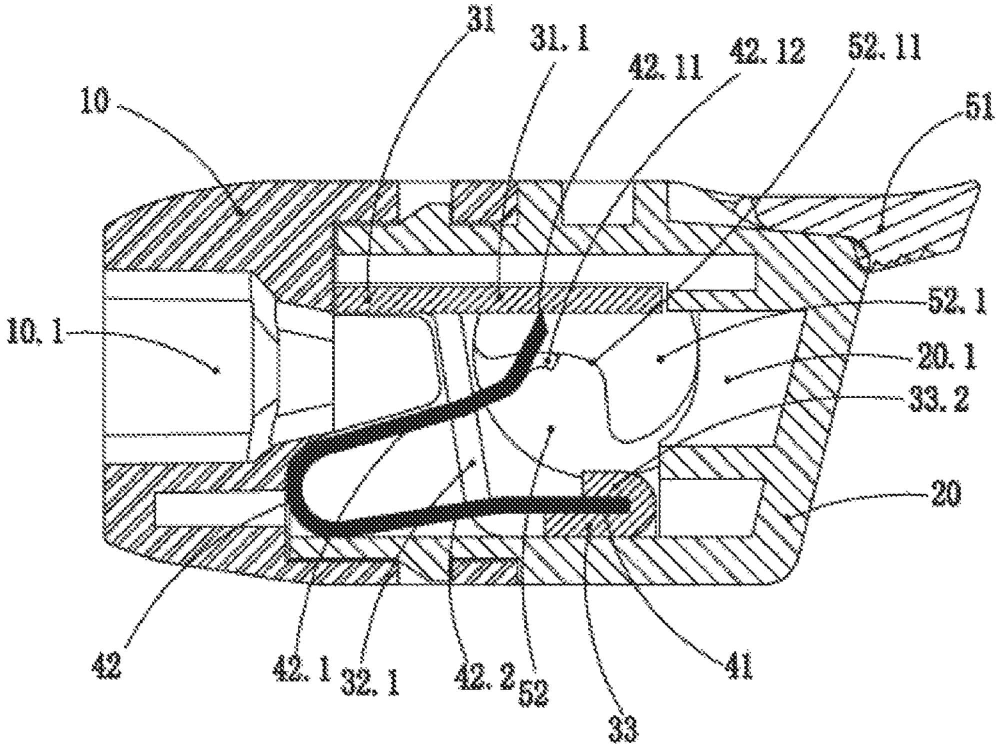
FIG. 4 is s an overall structural sectional view of the embodiment of the present invention.
Figure 5:
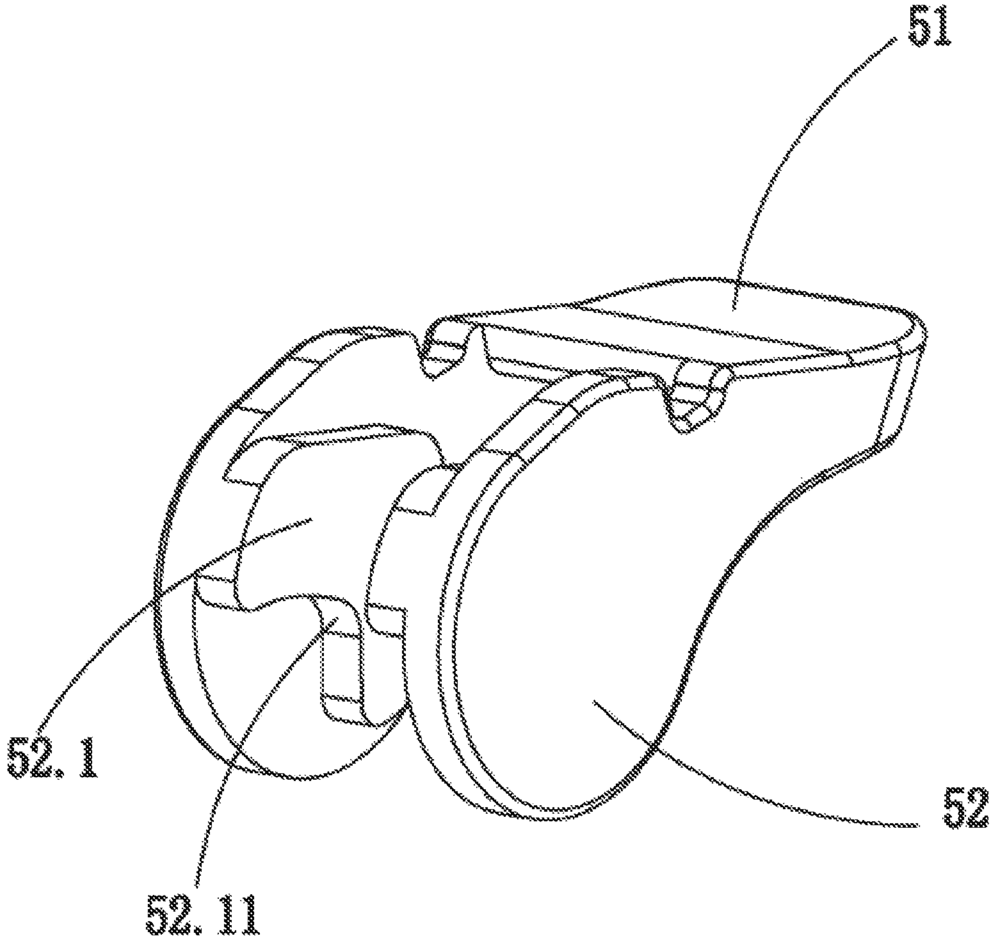
FIG. 5 is a structural schematic diagram of a poking cover of the embodiment of the present invention.

By referring to FIGS. 1-5:

A tail poking cover connector with a cage-type conducting mechanism comprises a front housing 10 and a rear housing 20; a front open chamber 20.1 is arranged in the rear housing 20, and the front housing 10 is fixedly connected with the rear housing 20 to close the front open chamber 20.1; and the cage-type conducting mechanism is arranged in the front open chamber 20.1.

The cage-type conducting mechanism comprises a conducting frame 30 and a conducting component 40.

The conducting frame 30 is in a Z shape and comprises an inclined vertical part 32 as well as an upper transverse part 31 and a lower transverse part 33 that are respectively arranged at the top end and the bottom end of the vertical part 32; three ports 32.1 are formed transversely side by side in the inclined vertical part 32, the upper transverse part 31 is provided with three conducting heads 31.1 corresponding to the ports 32.1 up and down one to one and extending backwards to a position above the lower transverse part 33, and three clamping grooves 33.1 corresponding to the ports 32.1 up and down one to one are formed at the top of the lower transverse part 33; and the clamping grooves 33.1 are arranged in the top surface of the tail end of the lower transverse part 33, and formed by transversely and upwards bending clamping strips 33.2 on the lower transverse part 33 at the bottom end.

The conducting component 40 comprises three V-shaped conducting elastic sheets 42 that are arranged on a same conducting board 41 and have the same number with the ports 32.1; and each of the V-shaped conducting elastic sheets 42 comprises an upper elastic sheet 42.1 and a lower elastic sheet 42.2, and is fixedly connected with the conducting board 41 by the tails ends of the respective lower elastic sheets 42.2 transversely at intervals, so that the respective upper elastic sheets 42.1 are arranged above the conducting board 41 in an upwarping manner.

The conducting frame 30 is fixedly installed in the front open chamber 20.1 in a manner that the upper transverse part 31 is arranged at a front part, and the lower transverse part 33 is arranged at a rear part; the three V-shaped conducting elastic sheets 42 on the conducting component 40 are respectively spliced into the three ports 32.1 in a one-to-one correspondence manner with sharp heads facing forwards; and the rear end of the conducting board 41 is spliced and fixed into all the clamping grooves 33.1, so that the conducting component 40 and the conducting frame 30 are fixedly connected with each other into a whole, the lower elastic sheets 42.2 of all the V-shaped conducting elastic sheets 42 are electrically connected with the conducting frame 30, and the tail ends of the upper elastic sheets 42.1 are elastically supported on the bottom surfaces of the respective corresponding conducting heads 31.1.

Three front wire plugging holes 10.1 corresponding to the ports 32.1 one to one are formed in the front end surface of the front housing 10, and each of the front wire plugging holes 10.1 penetrates through to the top surface of the upper elastic sheet 42.1 of the respective corresponding V-shaped conducting elastic sheet 42.

A rear wiring hole 20.2 directly facing the middle clamping groove 33.1 is arranged in the rear end surface of the rear housing 20.

Three poking covers 50 are arranged on the rear housing 20; and each poking cover 50 is rotatably arranged in the rear housing 20 and is used for driving the upper elastic sheet 42.1 of the corresponding V-shaped conducting elastic sheet 42 to move downwards, so as to separate from the corresponding conducting head 31.1, and the rear end of each poking cover is exposed out of the upper part of the rear housing 20, to facilitate the driving for the respective front end of the poking cover to rotate.

An upwarping part 42.11 in contact with the conducting head 31.1 is arranged at the rear end of the upper elastic sheet 42.1 of each V-shaped conducting elastic sheet 42, and the left side and the right side of the upwarping part 42.11 are symmetrically provided with downward arc-shaped bent driving lugs 42.12; each of the poking covers 50 comprises a handle 51 exposed out of the rear upper part of the rear housing 20 and two quasi-circular rotating arms 52 arranged at the front end of the handle 51 symmetrically left and right; and the two quasi-circular rotating arms 52 are arranged in through holes formed in the top surface of the rear housing 20, are rotatably connected with the rear housing 20 by axon parts 52.1 arranged on the respective inner surfaces and are slidably connected with the two driving lugs 42.12 on the corresponding V-shaped conducting elastic sheet 42 by "7"-shaped grooves 52.11 formed in the front lower parts of the respective axon parts 52.1 respectively.

A lead-in wire can be connected in advance to turn on a circuit of the conducting frame 30, and the lead-in wire can be connected with the middle clamping strip 33.2 along the rear wiring hole 20.2.

When a lead-out wire is installed, the handle 51 can be lifted, so that the quasi-circular rotating arms 52 at the front end of the corresponding poking cover 50 can press down the upper elastic sheet 42.1 on the corresponding V-shaped conducting elastic sheet 42 to separate from a conducting head 31.1, and the end of the lead-out wire is inserted into a gap between the upper elastic sheet 42.1 and the conducting head 31.1 along the corresponding front wire plugging hole 10.1; the handle 51 is pressed down to enable the poking cover 50 to reset, and the upper elastic sheet 42.1 can compress the wire end of the lead-out wire at the conducting head 31.1, so that the lead-out wire is fixed, and the circuit is turned on. The installation is very convenient.

Since the connection between the conducting frame 30 and the conducting component 40 does not depend on the front housing 10 and the rear housing 20, even though the front housing 10 or the rear housing 20 is partially damaged when in use, the conducting frame 30 and the conducting component 40 can still keep a connection state and normal power-on.

We claim:

1. A tail poking cover connector with a cage-type conducting mechanism, comprising a front housing (10) and a rear housing (20), wherein a front open chamber (20.1) is arranged in the rear housing (20), and the front housing (10) is fixedly connected with the rear housing (20) to close the front open chamber (20.1); the cage-type conducting mechanism is arranged in the front open chamber (20.1), and poking covers (50) are arranged on the rear housing (20), wherein the cage-type conducting mechanism comprises a conducting frame (30) and a conducting component (40); the conducting frame (30) is in a Z shape and comprises an inclined vertical part (32) as well as an upper transverse part (31) and a lower transverse part (33) that are respectively arranged at the top end and the bottom end of the vertical part (32); a plurality of ports (32.1) are formed transversely side by side in the inclined vertical part (32), the upper transverse part (31) is provided with a plurality of conducting heads (31.1) corresponding to the ports (32.1) up and down one to one and extending backwards to a position above the lower transverse part (33), and a plurality of clamping grooves (33.1) corresponding to the ports (32.1) up and down one to one are formed at the top of the lower transverse part (33); the conducting component (40) comprises a plurality of V-shaped conducting elastic sheets (42) that are arranged on a same conducting board (41) and have the same number with the ports (32.1); each of the V-shaped conducting elastic sheets (42) comprises an upper elastic sheet (42.1) and a lower elastic sheet (42.2); the conducting elastic sheets are fixedly connected with the conducting board (41) by the tails ends of the respective lower elastic sheets (42.2) transversely at intervals, so that the respective upper elastic sheets (42.1) are arranged above the conducting board (41) in an upwarping manner; the conducting frame (30) is fixedly installed in the front open chamber (20.1) in a manner that the upper transverse part (31) is arranged at a front part, and the lower transverse part (33) is arranged at a rear part; the plurality of V-shaped conducting elastic sheets (42) on the conducting component (40) are respectively spliced into the plurality of ports (32.1) in a one-to-one correspondence manner with sharp heads facing forwards; and the rear end of the conducting board (41) is spliced and fixed into all the clamping grooves (33.1), so that the conducting component (40) and the conducting frame (30) are fixedly connected with each other into a whole, the lower elastic sheets (42.2) of all the V-shaped conducting elastic sheets (42) are electrically connected with the conducting frame (30), and the tail ends of the upper elastic sheets (42.1) are elastically supported on the bottom surfaces of the respective corresponding conducting heads (31.1).

2. The tail poking cover connector with the cage-type conducting mechanism according to claim 1, wherein a plurality of front wire plugging holes (10.1) corresponding to the ports (32.1) one to one are formed in the front end surface of the front housing (10), and each of the front wire plugging holes (10.1) penetrates through to the top surface of the upper elastic sheet (42.1) of the respective corresponding V-shaped conducting elastic sheet (42).

3. The tail poking cover connector with the cage-type conducting mechanism according to claim 1, wherein a rear wiring hole (20.2) directly facing any clamping groove (33.1) is arranged in the rear end surface of the rear housing (20).

4. The tail poking cover connector with the cage-type conducting mechanism according to claim 1, wherein the number of the poking covers (50) is the same as that of the V-shaped conducting elastic sheets (42); and each poking cover (50) is rotatably arranged in the rear housing (20) and is used for driving the upper elastic sheet (42.1) of the corresponding V-shaped conducting elastic sheet (42) to move downwards, so as to separate from the corresponding conducting head (31.1), and the rear end of each poking cover is exposed out of the upper part of the rear housing (20), to facilitate the driving for the respective front end of the poking cover to rotate.

5. The tail poking cover connector with the cage-type conducting mechanism according to claim 4, wherein an upwarping part (42.11) in contact with the conducting head (31.1) is arranged at the rear end of the upper elastic sheet (42.1) of each V-shaped conducting elastic sheet (42), and the left side and the right side of the upwarping part (42.11) are symmetrically provided with downward arc-shaped bent driving lugs (42.12); and each of the poking covers (50) comprises a handle (51) exposed out of the rear upper part of the rear housing (20) and two quasi-circular rotating arms (52) arranged at the front end of the handle (51) symmetrically left and right; and the two quasi-circular rotating arms (52) are arranged in through holes formed in the top surface of the rear housing (20), are rotatably connected with the rear housing (20) by axon parts (52.1) arranged on the respective inner surfaces and are slidably connected with the two driving lugs (42.12) on the corresponding V-shaped conducting elastic sheet (42) by "7"-shaped grooves (52.11) formed in the front lower parts of the respective axon parts (52.1) respectively.

6. The tail poking cover connector with the cage-type conducting mechanism according to claim 1, wherein the clamping grooves (33.1) are formed in the top surface of the tail end of the lower transverse part (33).

7. The tail poking cover connector with the cage-type conducting mechanism according to claim 6, wherein each of the clamping grooves (33.1) is formed by transversely and upwards bending a clamping strip (33.2) on the lower transverse part (33) at the bottom end.

* * * * *